Jan. 16, 1945.  E. L. FICKETT ET AL  2,367,492
MACHINE TOOL CONTROL
Filed Feb. 3, 1943
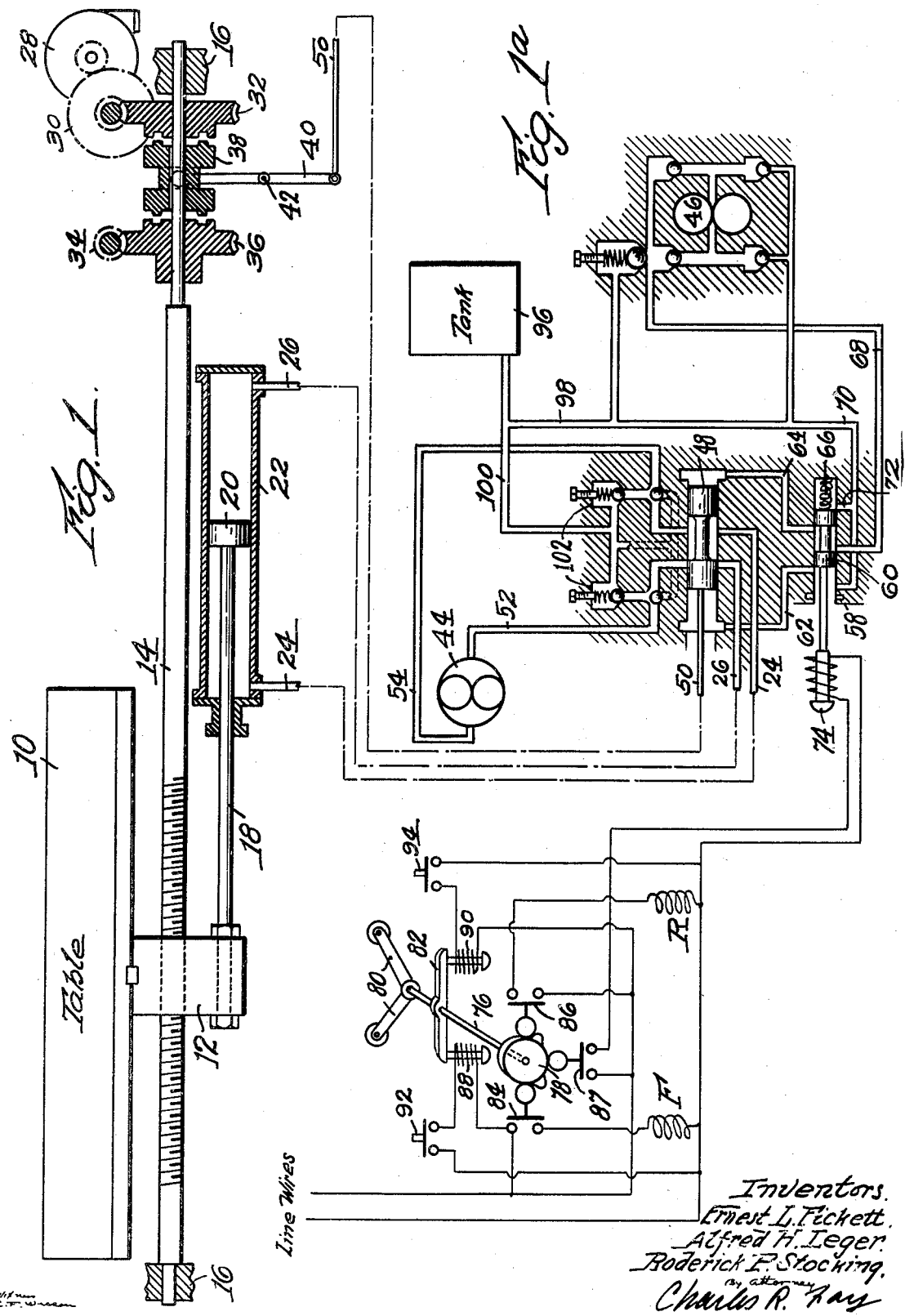
Inventors.
Ernest L. Fickett,
Alfred H. Leger,
Roderick P. Stocking,
by attorney
Charles R. Ray Patented Jan. 16, 1945

2,367,492

UNITED STATES PATENT OFFICE 2,367,492

MACHINE TOOL CONTROL

Ernest L. Fickett, Alfred H. Leger, and Roderick P. Stocking, Fitchburg, Mass., assignors to Fitchburg Engineering Corporation, Fitchburg, Mass., a corporation of Massachusetts Application February 3, 1943, Serial No. 474,562

18 Claims. (Cl. 90—21.5)

This invention relates to improvements in milling machine table controls.

Objects of the invention include the provision of a reciprocating milling machine work table or bed which is moved for the feeding operation at a slow speed by means of a hydraulic motor, there being a fixed screw shaft which is rotatable in engagement with a nut fixed in the work table to control the rate of movement of the table by holding back on the action of the hydraulic motor, in combination with means controlling the hydraulic motor for rapid traverse of the work table by means of a reverse rotation of the screw, the hydraulic motor being inactive during the rapid traverse.

Further objects of the invention include the provision of a valve cylinder having a piston for controlling the hydraulic motor, said piston being connected to a lever for simultaneous control of a clutch which is moved by the lever to engage alternately fast and slow gearing for the screw shaft; and the provision of a control shaft which is mounted in any convenient manner on the machine to be oscillated by dogs on the work table, said shaft controlling a forward and reverse connection for a reversible motor, said electric motor driving a pump for the hydraulic motor and the fast and slow gearing for the screw shaft; and the provision of solenoids arranged to oscillate said shaft upon energizing of the solenoids by means of switches controlled by further dogs on the work table.

Other objects and advantages of the invention will appear hereinafter.

Reference is to be had to the accompanying drawing in which

Fig. 1 is a schematic view of the work table and its operating mechanisms, and

Fig. 1a is a diagrammatical view of the electric controls and hydraulic controls for the operation of the work table.

The present invention is applicable to various types of machine tools of well known basic parts such as a relatively stationary tool which may be power driven and a relatively movable work table or bed, the latter being driven to move past the tool at slow feed during the working operation or selectively at a rapid traverse at times when the tool is inactive.

In the drawing, there is disclosed a work table or bed 10 which may be mounted in any convenient or desired way for traveling movement past a tool. The table 10 has fixed thereto a nut 12 which is engaged by a fixed screw shaft 14, the latter being mounted for rotative but non-axial movement in fixed bearings 16 on the machine. Nut 12, or other fixed element on table 10, is connected to a rod 18 having a piston 20 secured thereto, piston 20 being located in a cylinder 22. Cylinder 22 has pipes 24, 26 leading into opposite ends thereof for ingress and egress of fluid for operating on the piston to move the latter.

An electric motor 28 is mounted in fixed position on the machine, this motor being connected to gearing 30 which drives a worm gear 32. A conventional set of replaceable pickoff gears, not shown, connects gear 30 to another gear 34, the latter driving a worm gear 36. Worm gears 32 and 36 are mounted for rotative movement on and relative to shaft 14, and are adapted to be alternatively coupled thereto by means of a clutch 38. A lever 40 pivoted as at 42 to a fixed part of the machine is connected to the clutch for moving the latter to connect worm gear 32 or 36 to shaft 14 for rotating the latter at different speeds as represented by the different diameter gears 30, 34.

The electric motor 28 also drives gear pumps 44 and 46, the direction of the rotation of these pumps changing with the direction of rotation of the electric motor, thus determining the direction of movement of work table 10. A piston 48 operates in a cylinder as a valve to control the direction of fluid in pipes 24, 26. Piston 48 is moved to change the direction of flow of the hydraulic fluid in cylinder 22; it simultaneously controls clutch 38 to change the speed of rotation of shaft 14.

The gear pump 44 has associated therewith pipes 52 and 54 at opposite sides thereof, both of these pipes leading into the cylinder for piston valve 48. Pipes 24, 26 also lead into this cylinder, and it will be seen that piston 48 will connect pipes 24, 26, if moved to the left from the position shown in Fig. 1a. As shown, however, pipe 24 is connected with pipe 54 and the piston shuts off pipe 26 from pipe 24 although pipes 52 and 26 are still connected by means of a groove in the cylinder wall, not shown.

A separate cylinder 58 slidably houses a valve 60, this valve hydraulically controlling the position of piston 48 by means of pipes 62 and 64. A spring 66 normally holds valve 60 in the position shown in Fig. 1a so that a pipe 68 leading from pump 46 communicates with pipe 64 and another pipe 70 having a branch 72 communicates with pipe 62, so that piston valve 48 is maintained in position as shown whereby clutch 38 is engaged with worm wheel 36. A solenoid 74 is provided for moving valve 60 against the action of spring 66.

A rockable shaft 76 is mounted conveniently on the machine, this shaft having fixed thereto for oscillation therewith a cam 78 and a pair of arms 80. Arms 80 are disposed in the path of dogs on the table. These dogs are not shown as they are conventional in the art. Shaft 76 has also fixed thereto a lever 82 which is rockable therewith. In the wiring diagram, F represents the forward coils of motor 28 and R represents the reversing coils of the same motor. A switch 84 is disposed in position to be closed by cam 78 upon proper rotation thereof to energize the forward coil F and a similar switch 86 is disposed in angular relation to switch 84 for energizing reversing coil R upon a rotation of cam 78 in the opposite direction. It will be seen that switches 84 and 86 are adapted to be closed by the oscillation of shaft 76 in opposite directions under influence of appropriately located table dogs for changing the direction of rotation of motor 28 and thereby gears 30 and 34 and the gear pumps 44 and 46.

Solenoids 88 and 90 are connected to opposite ends of lever 82 and these solenoids are adapted to be energized by other table dogs which will contact switches 92 and 94 during the table movement. Both of switches 92 and 94 are adapted to energize solenoid 74 by rocking shaft 76 to close switch 87 by means of cam 78, and when closed either one of these switches will cause valve 60 to move against the tension of spring 66 to thereby cause piston 48 to be moved under hydraulic pressure.

A tank 96 is connected by pipes 98 and 100 into the gear pump system for maintaining a hydraulic balance in the system.

In the operation of the machine, the hydraulic motor 22 is effective to drive table 10 during its feed and at the same time screw 14 controls the rate of movement through cooperation with nut 12, this screw being a "hold back" device which instead of feeding the table holds it back against the hydraulic pressure but allows it to travel at the rate determined by gears 30. The hydraulic motor is driven by the gear pump 44, the volumetric discharge of this pump being slightly more than is necessary to maintain the pressure in cylinder 22 at the highest feed rate. It is not sufficient, however, to maintain pressure in the cylinder at rapid traverse rate, and when switch 87 is closed, valve 60 and piston 48 controlled thereby will ensure the direct connection of the two ends of the cylinder, whereupon the traverse of the table is accomplished solely by screw 14, in which case piston 20 is translated from end to end of the cylinder by the table movement. However, piston valve 48, upon being moved insures that clutch 38 engages worm wheel 36 for slow feed, but the two ends of the cylinder are no longer connected except through pump 44, and the feed rate of travel as above mentioned will be in effect. Any oil in excess of that required will be discharged through the adjustable relief valves 102, but if there is not sufficient oil, it will be drawn from tank 96 so that the system is always fully operative.

When the table 10 is at rest all the switches in the diagram are open. Switch cam 78 being rotated to the right slightly will close switch 84 to energize the forward coils of motor 28. Upon further rotation of switch cam 78 to the right, motor 28 will continue to run in a forward direction but switch 87 will be closed, thus energizing solenoid 74 and moving valve 60 to a position wherein hydraulic pressure from gear pump 46 will be applied to the piston valve 48 displacing the latter to the left and thus engaging clutch 38 with worm wheel 32, to impart rapid travel motion to the table by means of screw 14; and as previously stated, connecting cylinder pipes 24, 26 to allow the oil to flow from one end of the cylinder to the other. If switch cam 78 is rotated to the left, the motor will be reversed and the same action as just above described will result. If the cam is turned further either to right or left, switch 87 will be closed, thus energizing solenoid 74 to shift valve 60. This in turn shifts piston valve 48, changing the hydraulic cylinder connections and simultaneously changing the speed of rotation of shaft 14 by means of clutch 38. Piston valve 48 is movable to the right by movement of valve 60 under influence of spring 66 when switch 87 is open, and in this condition clutch 38 engages worm wheel 36 for the slow feed of the table.

Table dogs can shift the switch cam from rapid traverse to feed to stop. It may be desired however to rapid traverse in either direction of the table movement and to accomplish this, further table dogs are provided for closing switches 92 and 94. When either one of these switches is closed its corresponding solenoid 88 or 90 is energized, the solenoids acting on lever 82 to oscillate shaft 76 in the selected direction to close switch 87 and thus energize solenoid 74 to move valve 60 thus throwing the system into rapid traverse in either direction depending on which switch 92 or 94 has been closed. It will be apparent that solenoids 88 and 90 may be energized from a separate source in parallel with switches 92 and 94 so that remote control can be applied.

It may be here noted that valve 60 has but two positions, one of which depends on spring 66 and the other being dependent on solenoid 74. Thus clutch 38 will always be engaged with the feed worm wheel 36 except when solenoid 74 is energized, it being noted that pipe 68 is always the pressure pipe for pump 46, pipe 70 being the return.

Having thus described our invention and the advantages thereof, we do not wish to be limited to the details herein disclosed, otherwise than as set forth in the claims, but what we claim is:

1. In a machine of the class described, a movable carriage, a hydraulic motor, a piston therefor, said piston being connected to the carriage, means for supplying fluid to the motor, a screw shaft, a nut on the carriage engaging the screw shaft, means for imparting rotation to said screw shaft in either direction and control means therefor including means to render said motor inoperative for driving the carriage when the shaft is turned in one direction so that the shaft drives the carriage and for rendering said motor effective to drive the carriage when the shaft is turned in the other direction so that the shaft and nut act as a speed-limitation device.

2. In a machine of the class described, a carriage, a hydralic motor for driving said carriage, a screw shaft operatively engaged with said carriage, means to operate the motor to feed the carriage and means to rotate the screw in a direction to control the rate of feed of the carriage under influence of said motor, means to reverse the direction of rotation of said screw, and means controlling the operation of said last named means, said controlling means being effective to render said motor inoperative to drive the carriage upon reversal of the direction of rotation of said screw shaft whereby said carriage is selectively driven by said motor or by said screw shaft.

3. In a machine of the class described, a movable work table, a hydraulic cylinder and piston for moving said table, a pump for supplying fluid pressures to said cylinder, a piston valve to control the flow of fluid from the pump to the cylinder, means for controlling the rate of travel of said table under influence of the cylinder and piston, means for selectively controlling the rate of speed of said rate-control means including a clutch, and means attached to the piston valve for shifting said clutch by said piston valve.

4. In a machine of the class described, a work table, a cylinder and piston for moving said table, a screw shaft operatively connected to said table, means to rotate said shaft, means including a clutch for changing the speed of rotation of said shaft, a clutch shifter, and valve means attached to the clutch shifter and movable therewith and being effective to substantially simultaneously control the operation of said cylinder and piston while shifting the clutch, and conduit means between said valve and said cylinder, so constructed to render, in connection with said valve movement, said cylinder under neutral or feed pressure depending upon the position of said clutch shifter.

5. A machine as recited in claim 4 wherein said control means comprises a valve for said hydraulic system including a piston and means for controlling the position of said piston, said clutch shifter being attached to the piston.

6. Feed and traverse means for a machine tool work table, comprising a hydraulic cylinder, a piston for said cylinder, connections between the piston and cylinder to the table whereby the latter may be fed, an electric motor, a pump driven by the motor, a screw shaft operatively connected with the table, said motor being effective to rotate the screw at different speeds and opposite directions, means forming a valve and including a movable member for selectively connecting the ends of the cylinder to render the same inoperative for moving the table and to connect the pump with the cylinder to render the same operative for moving the table, said movable member being effective to control the direction of rotation of the screw shaft under influence of the motor, and said screw shaft traversing the table when said cylinder is rendered inoperative.

7. Feed and traverse means as recited in claim 6 including a second valve for controlling said movable member.

8. Feed and traverse means as recited in claim 6 wherein said movable means is a piston and including a hydraulic control valve for shifting said piston.

9. Feed and traverse means as recited in claim 6 including means forming a second valve, said movable valve member comprising a piston, hydraulic means controlling said second valve, and connections from said second valve to said piston for moving the latter by the action of the former for the purpose described.

10. A machine tool having a movable work table and including a hydraulic means and a mechanical means for traveling the table, means forming a valve for controlling the operation of the hydraulic means, said valve comprising a cylinder and piston, hydraulic connections between the cylinder and said hydraulic means, said connections being controlled by the position of the piston in the cylinder, means controlling the operation of the mechanical means, and a connection attaching said last named means to the piston for actuation of the former by the latter.

11. A machine tool as recited in claim 10 including a valve for controlling the position of the piston in the cylinder, and means for operating the last named valve.

12. A machine tool as recited in claim 10 including a valve for controlling the position of the piston in the cylinder, means normally maintaining said last named valve in one position, and means actuated by the movement of the table for shifting said last named valve to shift the piston.

13. A machine tool having a movable table, means for moving said table at different speeds and in opposite directions, and means actuated by the table movement to control the speed and direction of travel of the table, said means including a movable element, means to move the element, and a control for said last named means, said control comprising a shiftable member, a solenoid to shift said member when the solenoid is energized, a switch for controlling the solenoid, said switch being actuatable by a dog on the table, a cam on the shiftable member, and a switch operable by said cam.

14. A machine tool as in claim 13 including a second solenoid for shifting said shiftable member in the opposite direction and a switch for said second solenoid.

15. A machine tool table control comprising a valve or the like, and means for operating the valve, said means comprising a solenoid, a switch therefor, a cam operating the switch, a member operating the cam, said member being movable to operate the cam through dogs on the machine tool table, a solenoid for moving the member, a switch for said last named solenoid, said last named switch being closable directly by dogs on the table.

16. A control for a machine tool table comprising a valve and means to operate the valve, said means comprising a movable member, a pair of solenoids for moving said member in two directions, a switch for each solenoid, said switches being actuatable by the table movement, means actuated by movement of said member in either direction to operate the valve, said member including a cam, there being a switch operable by the cam, and a solenoid energizable through the last named switch to act directly on the valve.

17. A machine tool having a table, an electric motor, forward and reverse coils in the motor, a switch for each coil, a valve, a hydraulic motor controlled through the valve, electric means for operating the valve, a switch for controlling said electric means, a cam for actuating all three switches, a movable member for moving the cam to operate the switches, and separate mechanical and electrical means for moving said member under influence of the table movement, said motors both operating to move the table at different intervals.

18. The machine tool of claim 17 wherein said last named electrical means comprises a solenoid, and including a switch for the solenoid, said switch being actuatable by a dog on the table.

ERNEST L. FICKETT.
ALFRED H. LEGER.
RODERICK P. STOCKING.